United States Patent
Keeney et al.

(10) Patent No.: US 8,360,931 B2
(45) Date of Patent: Jan. 29, 2013

(54) POWER TAKE-OFF CLUTCH SYNCHRONIZING SYSTEM

(75) Inventors: Christopher S. Keeney, Troy, MI (US); Richard E. Gady, Rochester Hills, MI (US); Aaron Alexander Sinka, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 717 days.

(21) Appl. No.: 12/507,161

(22) Filed: Jul. 22, 2009

(65) Prior Publication Data
US 2011/0021314 A1    Jan. 27, 2011

(51) Int. Cl.
- *B60W 10/02* (2006.01)
- *B60W 10/04* (2006.01)
- *B60K 6/00* (2007.10)
- *B60K 8/00* (2006.01)
- *B60K 25/10* (2006.01)
- *B60K 17/354* (2006.01)

(52) U.S. Cl. ......... 477/175; 180/165; 180/242; 477/180

(58) Field of Classification Search ................. 477/5, 6, 477/8, 175, 179, 180; 180/65.29, 242, 165; 192/85 R; 903/960
See application file for complete search history.

(56) References Cited

U.S. PATENT DOCUMENTS

| | | | |
|---|---|---|---|
| 3,046,813 A | 7/1962 | Bixby | |
| 4,425,817 A | 1/1984 | Wells et al. | |
| 6,202,812 B1 | 3/2001 | Semke | |
| 6,644,428 B2 | 11/2003 | Gady et al. | |
| 7,047,838 B2 | 5/2006 | Varela et al. | |
| 7,322,436 B2 | 1/2008 | Gady et al. | |
| 7,337,696 B2 | 3/2008 | Bennett | |
| 7,841,432 B2 * | 11/2010 | Lynn et al. | 180/65.21 |
| 2003/0109351 A1 * | 6/2003 | Gradu | 475/269 |
| 2007/0251796 A1 * | 11/2007 | Moshenrose et al. | 192/84.3 |
| 2008/0093143 A1 * | 4/2008 | Harrison | 180/165 |
| 2010/0311543 A1 * | 12/2010 | Chang et al. | 477/174 |

FOREIGN PATENT DOCUMENTS

GB      2081402      2/1982

* cited by examiner

*Primary Examiner* — Tisha Lewis
(74) *Attorney, Agent, or Firm* — Carlson, Gaskey & Olds, PC

(57) ABSTRACT

A power take-off (PTO) is used to selectively run a secondary device. The PTO includes a clutch assembly having first and second clutch members that are selectively engaged with each other to drive the secondary device. The first clutch member is associated with a driving input and rotates at an input speed. An accumulator is in power communication with the secondary device and is used to provide power to temporarily drive the second clutch member via the secondary device such that a speed of the second clutch member can be synchronized with the input speed for clutch engagement.

24 Claims, 1 Drawing Sheet

POWER TAKE-OFF CLUTCH SYNCHRONIZING SYSTEM

TECHNICAL FIELD

The subject invention relates to a control system for synchronizing clutch engagement for a power take-off device that runs a secondary device.

BACKGROUND OF THE INVENTION

Vehicle gear boxes are used to transfer a driving input from a vehicle engine to a driving output to one or more drive axles. Gearboxes such as transmissions and transfers cases for example, include an internal gear drive that can provide a desired gear ratio configuration to provide a desired output speed/torque for the drive axles. Typically, a transfer case includes an input shaft that receives the driving input and a pair of output shafts that are configured to drive front and rear drive axles. The gear drive transfers the driving input from the input shaft to the pair of output shafts.

Transmissions and transfer cases are often equipped with a power take-off (PTO) device that is used to drive a secondary device such as a pump, compressor, or generator. The PTO may include a clutch assembly that allows the PTO to be disengaged from the secondary device when the secondary device is not in use. It is desirable to have the ability to engage the clutch "on the fly", i.e. during vehicle operation, when operation of the secondary device is needed. Traditionally, clutches that are able to engage "on the fly" are complex and expensive. It would be desirable to utilize a simple and inexpensive mechanical clutch but such mechanism are not conducive to engaging "on the fly."

SUMMARY OF THE INVENTION

An accumulator is used to store energy that is used to temporarily run a secondary device in a motive mode to synchronize power take-off (PTO) speeds of mating first and second clutch members prior to clutch engagement, such that "shift on the fly" clutch engagement can be accomplished. The PTO can be utilized in any type of gearbox, such as a transmission or transfer case for example.

In one example, a transfer case includes a PTO having a first clutch member that receives driving input from a transfer case input shaft and a second clutch member that is coupled to the secondary device. The first and second clutch members are disengaged when the secondary device is not in use. When the secondary device is needed, the PTO is configured to engage "on the fly." Energy stored within the accumulator is used to temporarily drive the secondary device to synchronize the rotating speed of the second clutch member with the rotating speed of the first clutch member, enabling engagement of a simple and inexpensive mechanical clutch.

In one example, the speed of the secondary device is controlled/varied via a power modulator device. A sensor assembly transmits speed data to a control unit, which in turn generates a control signal to operate the power modulator device to drive the secondary device at a desired speed to match/synchronize with the rotating speed of the first clutch member.

In one example, the first and second clutch members comprise a spline-over-spline clutch.

In another example, the first and second clutch members comprise a mechanical face clutch.

In one example, the secondary device comprises a hydraulic pump, pneumatic compressor, or electric generator (in which case the accumulator would comprise a battery pack or super-capacitor bank).

These and other features of the present invention can be best understood from the following specification and drawings, the following of which is a brief description.

DETAILED DESCRIPTION OF THE PREFERRED EMBODIMENT

Figure 1:
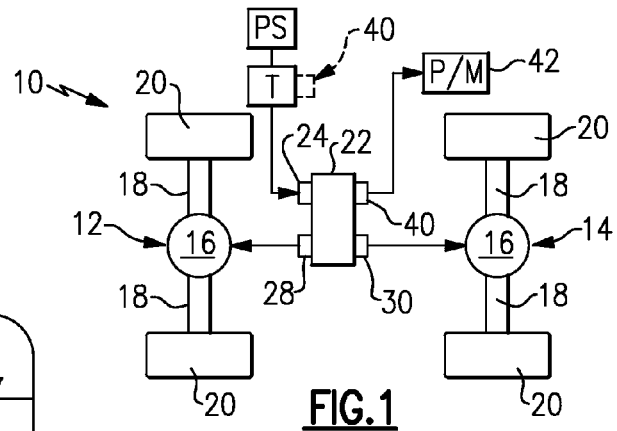
FIG. 1 is a schematic representation of a vehicle drivetrain configuration with a gear box including a power take-off (PTO) control system including the subject invention.

FIG. 1 is a schematic representation of a vehicle drivetrain 10 including first 12 and second 14 drive axles. The first 12 and second 14 drive axles each include a differential 16 that drives a pair of axle shafts 18, which in turn drive a pair of laterally opposed wheels 20. A vehicle power source PS, such as an engine or electric motor for example, provides driving input to a gearbox such as a transmission T or transfer case 22, which then is configured to provide driving output to the drive axles 12, 14.

In the example shown in FIG. 1, the transfer case 22 includes an input 24 that receives driving input torque from the transmission T which is driven by the vehicle power source PS. The transfer case 22 also includes a first output 28 that drives the first drive axle 12 and a second output 30 that drives the second drive axle 14.

Figure 2:
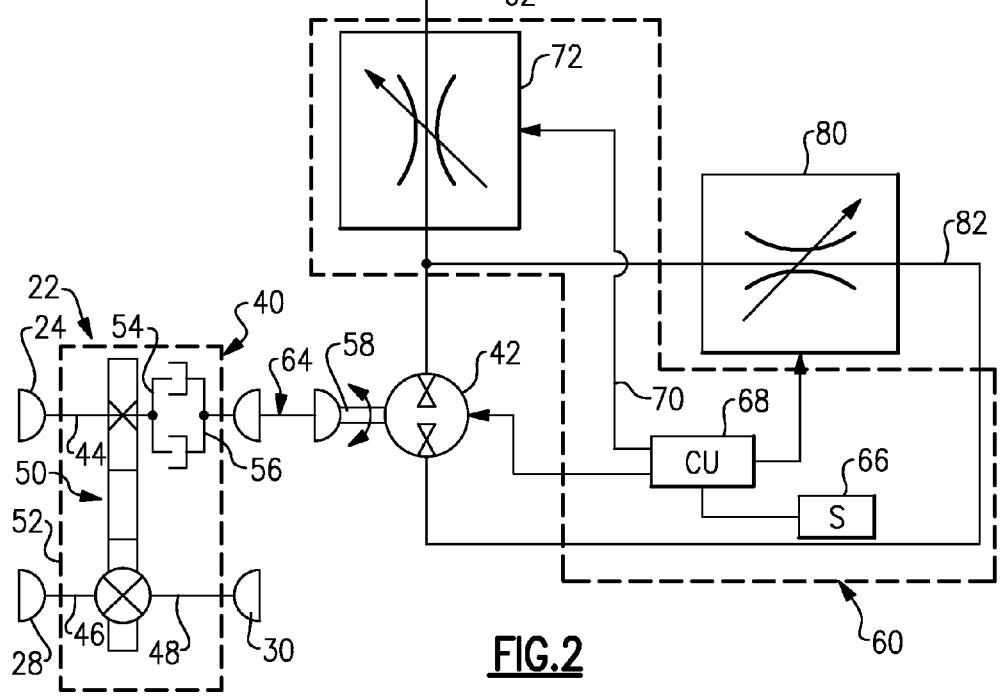
FIG. 2 is a schematic view of a gear box comprising a transfer case and also shows an associated control system of FIG. 1.

The transfer case 22 also includes a power take-off (PTO) 40 that is used to drive a secondary device 42, such as a pump, compressor, or generator for example. Optionally, as shown in FIG. 1, the PTO 40 could be utilized with the transmission T. As shown in FIG. 2, the transfer case 22 includes an input shaft 44 at the input 24, a first output shaft 46 at the first output 28, and a second output shaft 48 at the second output 30. A gear assembly 50 transfers the driving input from the input shaft 44 to the first 46 and second 48 output shafts as known. The input shaft 44, the first 46 and second 48 output shafts, and the gear assembly 50 are substantially enclosed within a transfer case housing 52.

The PTO 40 includes a clutch assembly having a first clutch member 54 coupled to the input shaft 44 and a second clutch member 56 coupled to a shaft 58 associated with the secondary device 42. Optionally, an intermediary driveline coupling 64 could be utilized to connect the shaft 58 to the second clutch member 56. The first 54 and second 56 clutch members are engaged with each other to drive the secondary device 42 via driving input supplied by the vehicle power source PS to the transfer case 22. When the secondary device 42 is not in use, the first 54 and second 56 clutch members are disengaged from each other.

In order to re-engage the first 54 and second 56 clutch members with each other "on the fly", i.e. when the vehicle is operating, a control system 60 is used to synchronize rotating speeds of the first 54 and second 56 clutch members. The control system 60 includes an accumulator 62 that stores potential energy/power for a later use. The accumulator 62 is in fluid communication with the secondary device 42. The secondary device 42 stores potential energy in the accumulator 62 during idle periods of operation for example. The accumulator 62 then transfers this reserve power back to the system to provide synchronization of the rotating speed of the second clutch member 56 with the rotating speed of the first clutch member 54. Any type of accumulator can be used to store the energy, and the accumulator can be configured to operate within a hydraulic, pneumatic, or electric system.

A sensor assembly 66 is used to monitor/measure rotating speeds of the first 54 and second 56 clutch members. Any type of sensor assembly including any number of different sensors can be used to compile speed data. The sensor assembly 66 transmits the speed data to a control unit 68 such as a microprocessor or other similar electronic control device. When the secondary device is to be driven via the PTO 40 by engaging the first 54 and second 56 clutch members, the control unit 68 generates a control signal 70 to a power modulator device 72 to allow power to be transferred from the accumulator 62 to the secondary device 42. The power modulator device 72 can comprise a variable flow restriction device such as a fluid control valve for example.

The amount of power flowing from the accumulator 62 to the secondary device 42 is controlled/varied to drive the shaft 58 of the secondary device 42, i.e. the shaft 58 that is coupled to the second clutch member 56, at the desired speed to synchronize with the rotating speed of the input shaft 44, which is coupled to the first clutch member 54. Once the speeds of the first 54 and second 56 clutch members are synchronized with each other to be within an allowable speed difference, the clutch members are moved into engagement with each other.

In one example, an additional flow restriction 80 is incorporated into a flow circuit 82 of the secondary device 42. The flow restriction 80 can be used to control fluid flow within the circuit 82 during operation of the secondary device 42.

Figure 3:
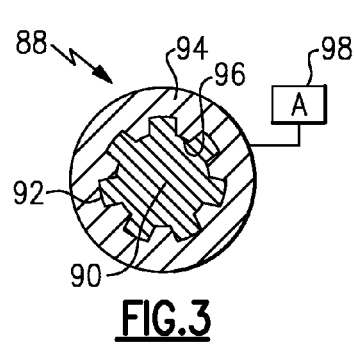
FIG. 3 is a schematic end view of one example of a clutch assembly for a PTO.
Figure 4:
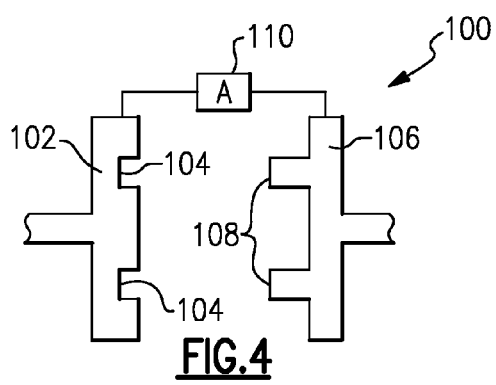
FIG. 4 is a schematic side view of another example of a clutch assembly for a PTO.

By using a charged accumulator 62 to temporarily run the secondary device 42 to synchronize speeds of mating clutch members, a simplified clutch assembly can be used. FIGS. 3 and 4 show examples of clutch assemblies that can be used for the PTO 40.

FIG. 3 shows a spline-over-spline clutch 88 that is used for the PTO 40. One of the first 54 and second 56 clutch members comprises a shaft portion 90 having a splined outer surface 92 and the other of the first 54 and second 56 clutch members comprises a shaft portion 94 having a splined inner surface 96. When the rotational speeds of the shaft portions 90, 94 are synchronized via the accumulator 62, an actuating element 98 initiates movement of the first 54 and second 56 clutch members into engagement via the splined connection interface between the splined inner surface 96 and the splined outer surface 92.

FIG. 4 shows a face clutch 100 that is used for the PTO 40. One of the first 54 and second 56 clutch members comprises a first member 102 having at least one recess 104 and the other of the first 54 and second 56 clutch members comprises a second member 106 having at least one projection 108. When the rotational speeds of the first 102 and second 106 members are synchronized via the accumulator 62, an actuating element 110 initiates movement of the first 54 and second 56 clutch members into engagement by inserting the projections 108 into the recesses 104.

As discussed above, the use of an accumulator allows simple and inexpensive clutch assemblies, such as spline-over-spline or dog clutches, to be used in a transfer case PTO. A speed synchronizing control scheme utilizes an existing downstream hydraulic, pneumatic, or electric system for the secondary device to charge the accumulator. The charged accumulator is then used to temporarily drive the secondary device to synchronize speeds across the clutch prior to engagement.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A power take-off control system comprising:
    a power take-off device including a mechanical clutch comprising a first clutch member and a second clutch member that selectively engages said first clutch member to drive a secondary device, wherein said first clutch member is rotating at an input speed; and
    an accumulator in power communication with said secondary device, said accumulator temporarily driving said second clutch member via said secondary device to synchronize a speed of said second clutch member with said input speed for clutch engagement, and wherein said accumulator is operated hydraulically or pneumatically.

2. The power take-off control system according to claim 1 wherein said first clutch member is coupled to an input shaft of a gearbox.

3. The power take-off control system according to claim 2 wherein said gearbox comprises a transfer case that includes a gear assembly that transfers driving input from said input shaft to first and second output shafts that respectively provide driving input into first and second drive axles.

4. The power take-off control system according to claim 1 wherein said mechanical clutch comprises a face clutch.

5. The power take-off control system according to claim 1 wherein said mechanical clutch comprises a spline-over-spline clutch.

6. The power take-off control system according to claim 1 including a power modulator device to control power flow between said accumulator and said secondary device.

7. The power take-off control system according to claim 1 including a sensor assembly that transmits speed data for said first and said second clutch members to a control unit, and wherein said control unit generates a control signal to run said secondary device via energy stored within said accumulator to synchronize a speed of said second clutch member with a speed of said first clutch member.

8. The power take-off control system according to claim 1 wherein said secondary device comprises one of a hydraulic pump, pneumatic compressor, or electric generator.

9. A gearbox with a power take-off for driving a secondary device comprising:
    an input shaft to receive driving input from a vehicle power source;
    at least one output shaft to transmit driving input to a drive axle;

a gear assembly that transfers driving input from said input shaft to said output shaft;

a mechanical clutch comprising a first clutch member coupled to said input shaft and a second clutch member for selective engagement with said first clutch member;

a secondary device associated with said second clutch member wherein said input shaft drives said secondary device when said first and said second clutch members are engaged, and wherein said secondary device is decoupled from said input shaft when said first and said second clutch members are disengaged from each other; and an accumulator in power communication with said secondary device, said accumulator providing power to drive said second clutch member via said secondary device to synchronize speeds of said first and said second clutch members for clutch engagement, and wherein said accumulator is operated hydraulically or pneumatically.

10. The gearbox according to claim 9 including a power modulator device to control power flow between said accumulator and said secondary device and a sensor assembly that transmits speed data for said first and said second clutch members to a control unit, and wherein said control unit generates a control signal to said power modulator device to run said secondary device via energy stored within said accumulator to synchronize a speed of said second clutch member with a speed of said first clutch member.

11. The gearbox according to claim 9 wherein said mechanical clutch comprises one of a spline-over-spline clutch or face clutch with one of said first and said second clutch members comprising a male clutch member and the other of said first and second clutch members comprising a female clutch member configured to engage said male clutch member.

12. The gearbox according to claim 9 wherein the gearbox comprises one of a transfer case or transmission.

13. A method of synchronizing a mechanical clutch comprising first and second clutch members for a power-take off clutch comprising the steps:

(a) storing energy in an accumulator by charging the accumulator with a hydraulic system or a pneumatic system;

(b) using stored energy accumulated in step (a) to temporarily run a secondary device coupled to one of the first and second clutch members at a desired speed to synchronize with a speed of the other of the first and second clutch members; and (c) engaging the first and second clutch members when the speeds are properly synchronized in step (b) to run the secondary device with driving input associated with the other of the first and second clutch members.

14. The method according to claim 13 wherein step (b) includes varying power flow from the accumulator to the secondary device via a power modulator device to control speed of the secondary device such that the speeds of the first and second clutch members can be synchronized.

15. The method according to claim 13 including associating the power-takeoff clutch with a transfer case.

16. The method according to claim 13 wherein one of the first and the second clutch members comprises a male clutch member and the other of the first and second clutch members comprises a female clutch member configured to engage the male clutch member.

17. The gearbox according to claim 9 wherein the gearbox comprises a transfer case.

18. The power take-off control system according to claim 1 wherein one of said first and said second clutch members comprises a male clutch member and the other of said first and second clutch members comprises a female clutch member configured to engage said male clutch member.

19. The power take-off control system according to claim 1 wherein said first clutch member is fixed for rotation with a transfer case shaft.

20. A gearbox with a power take-off for driving a secondary device comprising:

a gear housing comprising a transfer case housing;

a gear assembly enclosed with said gear housing, said gear assembly transferring driving input from an input shaft to at least one output shaft, and wherein said input shaft comprises a transfer case input shaft configured to receive driving input from a vehicle power source and said at least one output shaft is configured to transmit driving input to a drive axle;

a mechanical clutch comprising a first clutch member coupled to said input shaft and a second clutch member for selective engagement with said first clutch member, and wherein one of said first and said second clutch members comprises a male clutch member and the other of said first and second clutch members comprises a female clutch member configured to engage said male clutch member;

a secondary device associated with said second clutch member wherein said input shaft drives said secondary device when said first and said second clutch members are engaged, and wherein said secondary device is decoupled from said input shaft when said first and said second clutch members are disengaged from each other; and a speed synchronizing control that synchronizes speeds of said first and said second clutch members for clutch engagement, said speed synchronizing control including an accumulator in power communication with said secondary device.

21. The gearbox according to claim 20 wherein said male clutch member comprises a shaft having a splined outer peripheral surface and said female clutch member comprises a shaft having a splined inner peripheral surface that is received over said splined outer peripheral surface when said female and male clutch members are engaged.

22. The gearbox according to claim 20 wherein said female clutch member comprises a first member having an end face with at least one recess and said male clutch member comprises a second member having an end face with at least one projection that is received within said at least one recess when said female and male clutch members are engaged.

23. A gearbox with a power take-off for driving a secondary device comprising:

a gear housing;

a gear assembly enclosed with said gear housing. said gear assembly transferring driving input from an input shaft to at least one output shaft;

a mechanical clutch comprising a first clutch member coupled to said input shaft and a second clutch member for selective engagement with said first clutch member;

a secondary device associated with said second clutch member wherein said input shaft drives said secondary device when said first and said second clutch members are engaged, and wherein said secondary device is decoupled from said input shaft when said first and said second clutch members are disengaged from each other: and a speed synchronizing control that synchronizes speeds of said first and said second clutch members for clutch engagement, said speed synchronizing control including an accumulator in power communication with said secondary device, and wherein said accumulator provides power to drive said second clutch member via said secondary device to synchronize speeds of said first and said second clutch members for clutch engagement, and wherein said speed synchronizing control utilizes a hydraulic system or a pneumatic system.

24. The gearbox according to claim 23 including a power modulator device to control power flow between said accumulator and said secondary device and a sensor assembly that transmits speed data for said first and said second clutch members to a control unit, and wherein said control unit generates a control signal to run said secondary device via energy stored within said accumulator to synchronize a speed of said second clutch member with a speed of said first clutch member.

* * * * *